United States Patent [19]

Monten

[11] 3,738,515

[45] June 12, 1973

[54] TRAILER FOR TRANSPORTING ONE PIECE SWIMMING POOL SHELLS
[75] Inventor: Gordon A. Monten, Seattle, Wash.
[73] Assignee: San Juan Products, Inc., Seattle, Wash.
[22] Filed: July 16, 1971
[21] Appl. No.: 163,238

[52] U.S. Cl.................... 214/152, 214/1 G, 296/3
[51] Int. Cl............................................. B60p 3/00
[58] Field of Search................. 214/38 R, 38 CA, 214/38 CC, 152, 1 A, 1 H, 1 Q; 296/3

[56] References Cited
UNITED STATES PATENTS
3,157,426  11/1964  Groat.................................. 296/3
2,370,083  2/1945  Smith............................. 214/1 Q X Primary Examiner—Robert G. Sheridan
Attorney—Richard W. Seed, Benjamin F. Berry, Carl G. Dowrey et al.

[57] ABSTRACT

One piece swimming pool shells of glass fiber reinforced construction are transferred from a manufacturing site to an installation site by a trailer which allows the pool shell secured to a support structure to be loaded onto the trailer in a horizontal position and then rotated to a substantially vertical position for transport. At the installation site the pool shell is returned to the horizontal position, lifted from the trailer and set in place in the excavation. The support structure is then removed.

7 Claims, 5 Drawing Figures

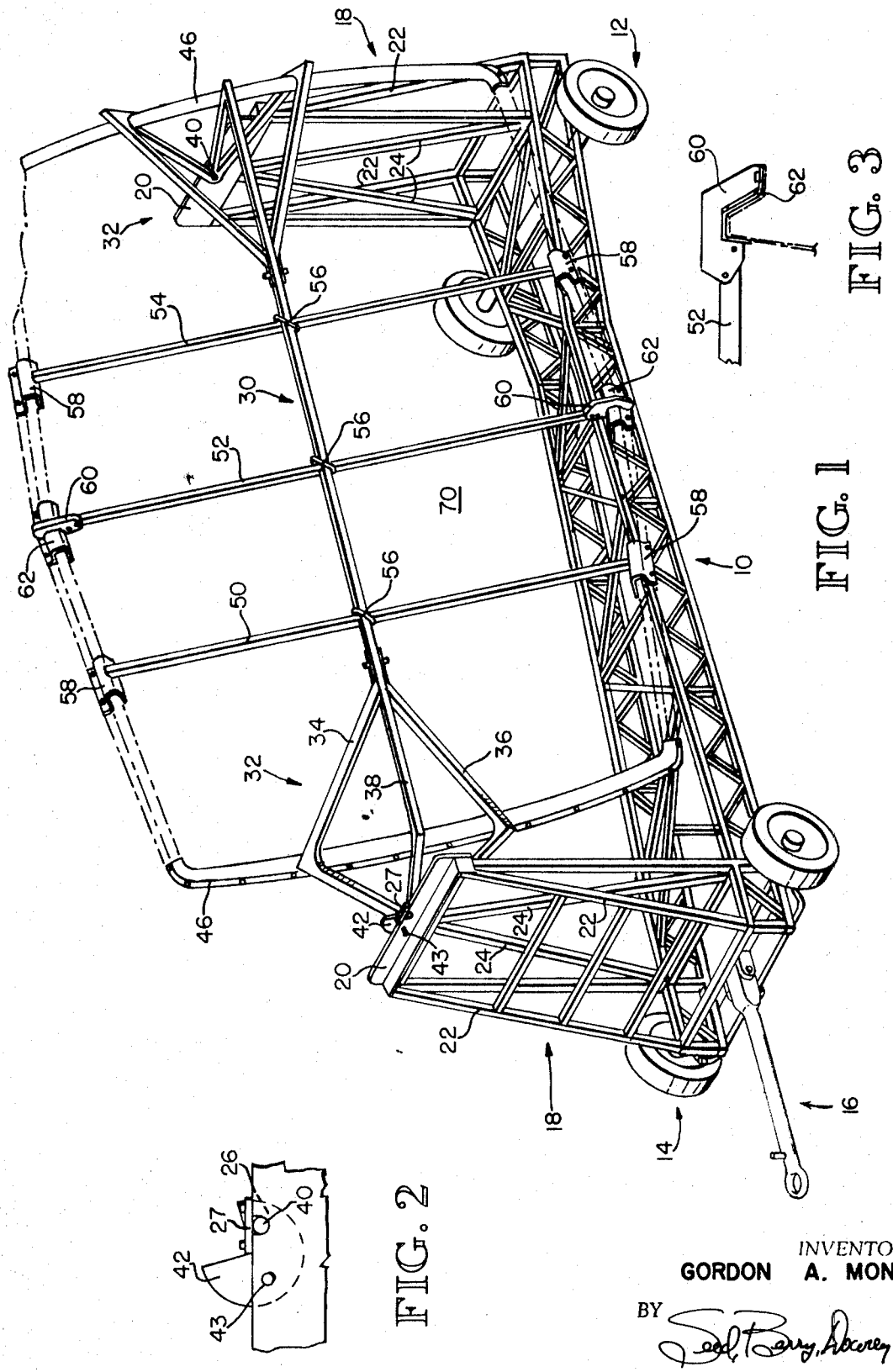

INVENTOR.
GORDON A. MONTEN

ATTORNEYS

TRAILER FOR TRANSPORTING ONE PIECE SWIMMING POOL SHELLS

BACKGROUND OF THE INVENTION

1. Field of the Invention

This invention relates to a trailer for transporting one piece swimming pool shells and to the method thereof.

2. Prior Art Relating to the Disclosure

One piece swimming pool shells of glass fiber reinforced construction, as disclosed in U. S. Pat. No. 3,568,392, may be made in a variety of shapes and forms. It is impractical to attempt to transport one piece pool shells on a conventional truck bed because of the configuration of the pool shell, the difficulty in unloading and loading the shell, potential damage to the pool shell during transport, and the labor and time cost required to do so. Additionally the pool shells, which may be 12 to 18 ft. in width and 30 to 40 ft. in length, exceed the allowable width for transportation on Federal and State highways without special permission.

SUMMARY OF THE INVENTION

It is a primary object of this invention to provide a trailer for transporting one piece swimming pool shells from a manufacturing location to an installation location.

It is a further object of this invention to provide a trailer for one-piece glass fiber reinforced swimming pool shells wherein the pool shell is loaded onto the trailer in a horizontal position, rotated to a substantially vertical position for transport and returned to the horizontal position for unloading.

A further object of this invention is to provide a trailer for transporting one-piece swimming pool shells wherein a horizontal support bar having trunnions at each end and carrying transverse spreader bars is secured to the pool shell and the pool shell lifted into position in trunnion blocks supported by two uprights on a wheeled frame.

BRIEF DESCRIPTION OF THE DRAWINGS

FIG. 1 is a perspective view of the trailer of this invention showing the pool shell in phantom in position for transport;

FIG. 2 is a partial end view of one of the trunnions and trunnion blocks supporting the pool shell;

FIG. 3 is a partial side view of the mid-spreader bar assembly;

DESCRIPTION OF THE PREFERRED EMBODIMENTS

Figure 5:
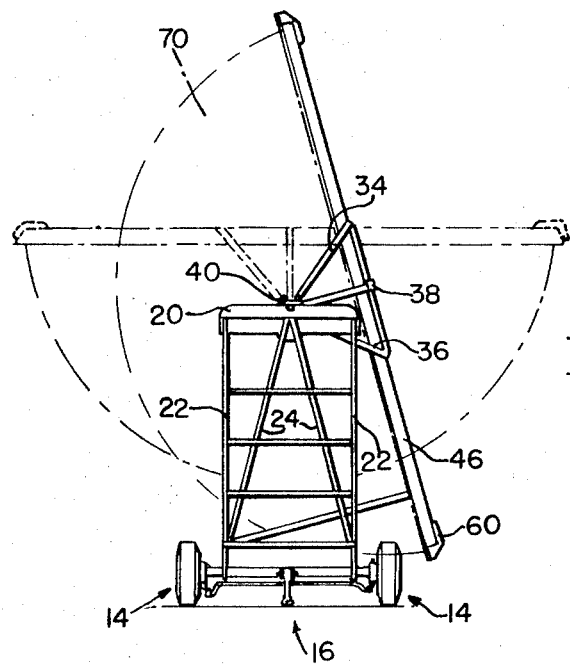
FIG. 5 is a front view of the trailer of FIG. 4 showing the pool shell in phantom for loading and in a substantially vertical position for transport.

Referring to FIG. 1 an elongated frame 10 is supported at its rear and forward end by pairs of wheels 12 and 14. The trailer may be connected to a truck or vehicle (not shown), by any suitable means 16. At each end of the frame is secured a vertical upright member 18, each member topped by a horizontal beam 20. Reinforcing members 22 and 24 aid in stabilizing the uprights. The distance between the vertical uprights should be sufficient to allow the pool shell to fit therebetween. The horizontal beam 20 atop each of the vertical uprights 18 incorporates a trunnion block 26 designed to carry the weight of the pool shell. The trunnion pins of the shell are held in place in the trunnions by retaining member 27. The retaining member is connected for pivotal movement to the beam 20 at one end and is releasably latched to the beam at the opposite end. A pin 43 extends through beam 20 into a hole in plate 42 to aid in retaining the pool shell in either the horizontal or substantially vertical positions. The height of each trunnion block from the upper portion of frame 10 should be sufficient to allow the pool shell to be rotated to a substantially vertically position as shown in FIG. 5 without interference with the frame.

The pool shell is initially secured to a support assembly and then lifted into the trunnion blocks on the trailer with a crane or other means. The support assembly includes an elongated support bar 30 having extensions 32 secured to each end. Each extension includes a pair of outwardly diverging side members 34 and 36 and a central member 38. The extensions 34 and side members 36 and 38 are L-shaped and converge at a common point where they are secured to plate 42. Extending outwardly from plate 42 are trunnion pins 40 adapted to seat in trunnion blocks 26. The trunnion pins 40 are preferably located a distance below the top of the pool shell, when mounted on the support assembly as shown in FIG. 5, approximating the balance points of the pool shell, thus making it easier to rotate the pool shell from a horizontal loading position into a substantially vertical transport position and also making the pool shell more stable for transport. Secured to the extensions 32 on each end are cap members 46 of glass fiber-reinforced resin construction, metal or other suitable materials. The cap members are designed to fit over and be bolted or otherwise secured to the terminating flange of the end walls of the pool shell.

A series of spreader bars 50, 52 and 54 extend transversely of the horizontal bar 30 and are secured thereto by U-bolts 56 or other suitable means. Bars 50 and 54 extend the width of the pool shell and have mounted on their terminating ends flanged portions 58 of glass fiber reinforced resin or other suitable material contoured to fit over the terminal flange of the side walls of the pool shell. The flanged portions 58 are bolted or otherwise secured to the flange of the pool shell. Spreader bar 52 includes clamping members 60 on each end which are clamped to flanged portions 62 bolted to the pool shell as shown in FIG. 3. The spreader bars stabilize the pool shell against collapse during transport from the manufacturing site to the installation site.

One piece pool shells, referenced by reference number 70 in the drawings, are made using a master mold by laying layer after layer of glass fiber cloth and resin. The pool shell may be of any configuration desired such as the essentially rectangular configuration shown. When the pool is completed and ready for transport from the manufacturing site to the installation site the respective cap members 46 carrying the extensions 34, 36 and 38 and horizontal bar 30 are bolted to the flanges of the end walls of the pool shell. The transverse spreader bars are then bolted to the horizontal bar 30 and the flanged portions on each end bolted to the flanges of the respective side walls of the pool shell as shown. The pool shell is then lifted by a crane or other suitable means and the pins are seated in the trunnion blocks 26. The retaining member 27 is secured over the trunnion pins to hold them in place.

Figure 4:
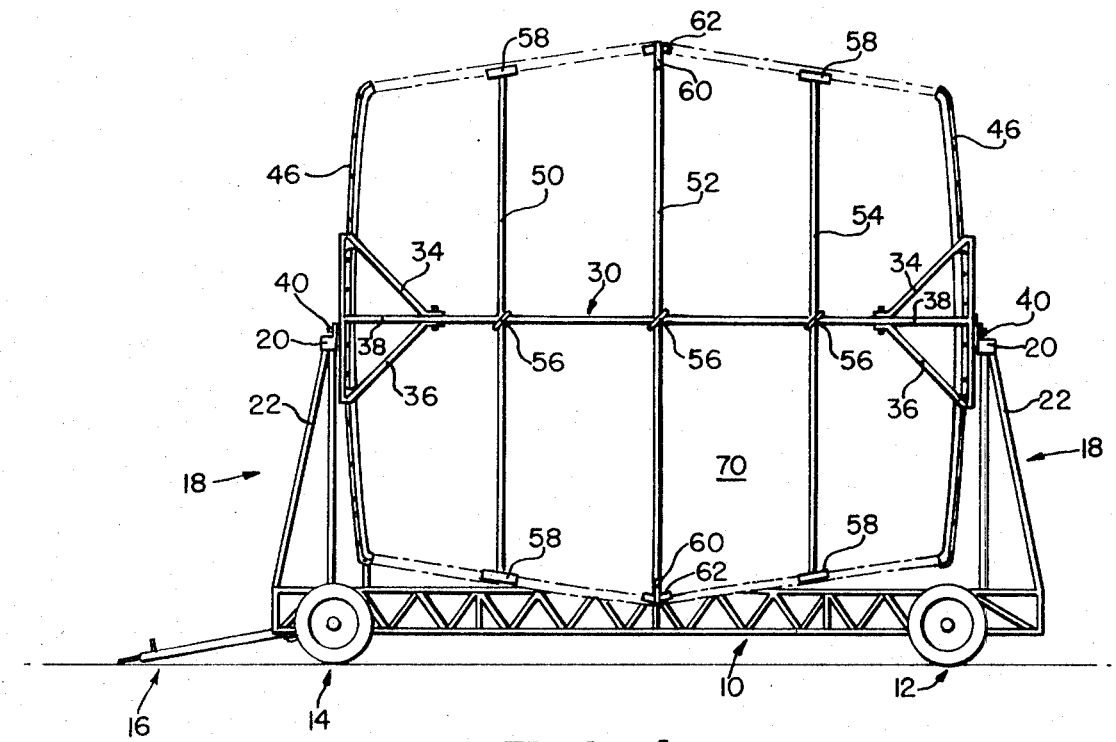
FIG. 4 is a side elevational view of the trailer and pool shell of FIG. 1.

The pool shell is then rotated to a substantially vertical position as shown in FIGS. 1, 4 and 6 and pin 43 inserted through the horizontal member 20 and plate 42 to secure the pool in the vertical position. Chains, ropes or other suitable means may also be used to help secure the pool in the vertical position. The pool is then ready for transport to the installation site with a truck or other suitable vehicle. Once at the installation site the pool shell is returned to the horizontal position, the retaining members 27 covering the trunnion pins removed and the shell lifted from the trailer and placed in the excavation. The spreader bars and cap members are then unbolted from the pool shell.

The trailer of this invention provides an economical and practical means of transporting one-piece swimming pool shells of glass fiber reinforced resin construction with safety and minimum labor costs.

The embodiments of the invention in which a particular property or privilege is claimed are defined as follows:

1. A trailer for transporting one-piece swimming pool shells from a manufacturing site to an installation site comprising:

an elongated wheeled frame extending substantially horizontally at least the length of the pool shell having uprights near each end thereof designed to support the pool shell, means for hitching the frame to a hauling means, a support assembly including a support bar secured to the pool shell for support thereof spanning the distance between the uprights and terminating in trunnion pins at each end thereof for pivotally mounting the pool shell in the trunnion blocks for movement between a loading position wherein the pool shell is in a substantially horizontal position and a transport position wherein the pool shell is tilted to a substantially vertical position, members secured to the end walls of the pool shell and to the support bar, and lock means for locking the pool shell and support assembly in the transport position.

2. The trailer of claim 1 wherein the trunnion pins of the support are disposed approximately at the balance point of the pool shell secured thereto.

3. The trailer of claim 1 including spreader bars secured to the support bar extending transversely thereto, each of the spreader bars secured at each of their ends to the side walls of the pool shell.

4. The trailer of claim 3 wherein the spreader bars terminate in flanged portions secured to the sidewalls of the pool shell.

5. A trailer for transporting a one-piece glass fiber reinforced resin pool shell from the manufacturing site to an installation site, the pool shell essentially rectangular in shape and having side and end walls terminating in flange portions, comprising:

an elongated wheeled undercarriage extending substantially horizontally at least the length of the pool shell, uprights mounted near each end of the frame designed to support the pool shell, trunnion blocks carried by each of the uprights, means for hitching the undercarriage of the trailer to a hauling means, a support assembly adapted to support and be secured to the pool shell including a support bar spanning the distance between the uprights, terminating in trunnion pins at each end thereof for pivotably mounting the pool shell secured thereto in the trunnion blocks carried by the uprights for movement between a loading position wherein the pool shell is in a substantially horizontal position to a transport wherein the pool shell is tilted to a substantially vertical position, the pivot point for the pool shell located at the approximate balance point of the pool shell, cap members secured to the support bar and extending substantially the width of the pool shell and secured to the end walls thereof, lock means for locking the pool shell and support assembly in the transport position, and spreading bars secured to the support bar extending substantially transversely thereto between the respective side walls of the pool shell, each of the spreader bars terminating in flanged portions secured to the respective side walls.

6. A method of transporting a one-piece swimming pool shell from a manufacturing site to an installation site comprising:

providing a trailer comprising an elongated wheeled frame having vertical uprights carrying trunnion blocks at each end, the distance between the uprights sufficient for insertion of a pool shell therebetween, securing the one-piece pool shell to a support assembly having trunnion pins at each end thereof, lifting the one-piece pool shell and support assembly secured thereto to seat the trunnion pins in the trunnion blocks carried by the uprights, and rotating the pool shell from a substantially horizontal position to a substantially vertical position for transport from the manufacturing site to the installation site.

7. The method of claim 6 wherein, once the installation site is reached, including rotating the pool shell to a substantially horizontal position, lifting the pool shell and support assembly from the trunnion blocks, lowering the pool shell in the excavation, and removing the support assembly from the pool shell.

* * * * *

UNITED STATES PATENT OFFICE
CERTIFICATE OF CORRECTION

Patent No. 3,738,515  Dated June 12, 1973

Inventor(s) Gordon A. Monten

It is certified that error appears in the above-identified patent and that said Letters Patent are hereby corrected as shown below:

In column 3, after line 27 and before line 28, insert:

--trunnion blocks carried by each of the uprights for supporting the pool shell,--;

In column 4, line 26, change "spreading" to --spreader--.

Signed and sealed this 5th day of March 1974.

(SEAL)
Attest:

EDWARD M. FLETCHER, JR.
Attesting Officer

C. MARSHALL DANN
Commissioner of Patents